(12) United States Patent
Yu

(10) Patent No.: US 6,928,997 B2
(45) Date of Patent: Aug. 16, 2005

(54) DIRECT INJECTION ENGINE

(75) Inventor: Chul Ho Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/991,214

(22) Filed: Nov. 17, 2004

(65) Prior Publication Data

US 2005/0139190 A1    Jun. 30, 2005

(30) Foreign Application Priority Data

Dec. 30, 2003  (KR) .................. 10-2003-0100886

(51) Int. Cl.[7] ............................................. F02B 23/00
(52) U.S. Cl. .................................. 123/657; 123/193.6
(58) Field of Search ......................... 123/193.5, 301, 123/657, 659, 667, 671, 193.6

(56) References Cited

U.S. PATENT DOCUMENTS 4,005,684 A * 2/1977 Habu ......................... 123/255
6,129,065 A * 10/2000 Ueda et al. ............... 123/193.6
6,216,662 B1 * 4/2001 Sapsford ..................... 123/301

* cited by examiner

*Primary Examiner*—Bibhu Mohanty
(74) *Attorney, Agent, or Firm*—Morgan Lewis & Bockius LLP

(57) ABSTRACT

An exhaust-valve-side portion of a bottom surface of a bowl is connected to an upper surface of a piston by a smoothly curved surface. Therefore, a separation of a tumble flow can be minimized and air flow introduced into the bowl is more strongly tumbled. Fuel mixed with the air flow is also introduced into the bowl, so a generation of a carbon layer that is caused by contact of fuel and oil with the wall can be prevented. A width of the exhaust-valve-side portion of the bowl is greater than a width of the intake-valve-side portion of the bowl and the side walls of the bowl are formed as curved surfaces. The intake valve pocket is formed as a single groove, accumulation of carbon can be minimized, and propagation of a flame during the combustion occurs easily.

18 Claims, 4 Drawing Sheets

DIRECT INJECTION ENGINE

CROSS REFERENCE TO RELATED APPLICATIONS

This application claims priority of Korean Application No. 10-2003-0100886, filed on Dec. 30, 2003, the disclosure of which is incorporated herein by reference.

TECHNICAL FIELD OF THE INVENTION

The present invention generally relates to a direct injection engine. More particularly, the direct injection engine tumbles the intake air flow in order to increase fuel economy and decrease an amount of noxious exhaust gas generated during cold start.

BACKGROUND OF THE INVENTION

A gasoline direct injection engine is an engine that has advantages of both a gasoline engine and a diesel engine. These advantages generate a high fuel economy engine. In the gasoline direct injection engine, fuel is directly injected into a combustion chamber. In this gasoline direct injection engine, intake flow is a very important factor in determining engine efficiency. The intake flow is determined by the shape of the intake ports, the combustion chamber, and the pistons. Research on intake flow characteristics has continuously been undertaken to prevent wall flow of the intake air and to make the intake air mix with the fuel in a short time period.

Various such engines are described in the art. For example, a gasoline direct injection engine is disclosed by an applicant of this application in a Korean patent application No. 10-2001-0059601. The gasoline direct injection engine disclosed in the above-stated application includes a combustion chamber that is defined by a lower surface of a cylinder head and an upper surface of a piston. The piston is disposed within a cylinder and an intake valve and an exhaust valve are respectively disposed within an intake port and an exhaust port. The intake and exhaust ports are formed on both sides of the cylinder head. A spark plug is disposed at a center portion of the lower surface of the cylinder head and a fuel injector, for injecting fuel into the combustion chamber is also disclosed.

The combustion chamber is formed between a bottom surface of the cylinder head including an intake-valve-side slanted surface and an exhaust-valve-side slanted surface. An upper surface of the piston has a pent roof shape including an intake-valve-side slanted upper surface and an exhaust-valve-side slanted upper surface corresponding, respectively, to the intake-valve-side slanted surface and the exhaust-valve-side slanted surface.

A bowl is formed in a pent-roof-shaped protrusion portion that is formed on the intake-valve-side slanted upper surface and the exhaust-valve-side slanted upper surface. A bottom surface of the bowl is formed such that the bowl has a depth increasing on approach to the intake side.

A split wall is disposed within the intake port such that the intake port is divided into an upper passage, acting as a passage for generating a tumble flow, and a lower passage. A valve, which operates to open or close the lower passage by a control of an engine control unit is disposed at an inlet of the lower passage.

The bowl looks like a trapezoid when it is seen from the top and a width of an exhaust-valve-side portion of the bowl is greater than a width of an intake-valve-side portion thereof. A bottom surface of the bowl is formed as a curved surface such that a depth of the bowl substantially gradually increases on approach to the intake-valve-side portion thereof. An intake-valve-side ramp of the bowl is substantially vertical. The spark plug is disposed to inject fuel from a portion near the intake port toward a combustion chamber above the bowl.

Therefore, if the piston moves down to introduce intake air, intake air passes through the upper passage and then enters the combustion chamber in a tumbled state. The tumble flow is strengthened in the combustion chamber. Then, the piston moves up to compress the air-fuel mixture and the tumble flow is further increased while the mixture is flowing in the bowl. While an air flow is introduced from the wide exhaust-valve-side portion of the bowl to the narrow and deep intake-valve-side portion of the bowl, a degree of a tumble flow is increased. The flow collides with the ramp and then the flow rapidly rises thereby reaching the spark plug.

During such a process, fuel injected from the fuel injector cooperates with the strong tumble flow, so that injected fuel does not collide with the bottom surface of the bowl of the piston and is evaporated in a short time. The air-fuel mixture then reaches the spark plug and is burned.

However, with such a conventional configuration, a protrusion is formed in an air inlet portion of the bowl. The protrusion causes a separation phenomenon that a portion of the tumble flow is separated instead of being sent toward the intake-valve-side portion of the bowl. Such separation phenomenon may deteriorate the combustion stability and the injected fuel may contact oil so that a carbon layer can be formed. Furthermore, a summit portion of the protrusion portion is formed as a flat portion. Therefore, a portion of the tumble flow may go beyond the side surface of the bowl and around the flat portion. This may decrease an integrity of the tumble flow and also weaken a squish flow, and this may be a cause of incomplete combustion. Still furthermore, valve pocket is divided by a step portion so that carbon may accumulate. The step portion may hinder a spread of firing and this may cause a knocking.

The information disclosed in this Background of the Invention section is only for enhancement of understanding of the background of the invention and should not be taken as an acknowledgement or any form of suggestion that this information forms the prior art that is known to a person skilled in the art.

SUMMARY OF THE INVENTION

An embodiment of the present invention provides a direct injection engine in which a flow of intake air is highly tumbled to increase combustion stability and thereby improve fuel economy and engine power. In addition, an embodiment of the present invention provides a direct injection engine in which a propagation of a flame during combustion easily occurs so that combustion characteristics are further improved. Furthermore, an embodiment of the present invention provides a direct injection engine in which wall wetting can be minimized so that an amount of hydrocarbon emissions can be minimized.

In a preferred embodiment of the present invention, the direct injection engine includes a combustion chamber formed between a lower surface of a cylinder head that is formed as a pent roof shape and an upper surface of a piston head with a pent-roof-shaped protrusion portion corresponding to the shape of the lower surface of the cylinder head. An intake valve and an exhaust valve that are respectively disposed in an intake port and an exhaust port that are formed in the cylinder head. A spark plug that is disposed in the cylinder head and a fuel injector for directly injecting fuel into the combustion chamber. The protrusion portion of the piston head is formed in a state of being biased toward an exhaust valve side from a cylinder center axis. A bowl is formed on the protrusion portion along a direction perpendicular to a direction of a crankshaft axis. An exhaust-valve-side portion of the bowl is opened and a width of the exhaust-valve-side portion of the bowl is wider than a width of an intake-valve-side portion thereof. Side walls of the bowl are formed as a curved surface that are indented toward the outside. A bottom surface of the bowl is slanted such that a depth of the bowl becomes deeper when approaching the intake-valve-side portion and the intake port is formed such that intake air moves toward the exhaust-valve-side portion of the bowl.

The bowl is preferably formed within the protrusion portion of the piston head. It is preferable that side walls of the bowl are slanted toward the outside. It is also preferable that side walls of the bowl are formed as a whole as a curved line. Preferably, the exhaust-valve-side portion of the bowl is connected to a head surface of the piston through a curved surface. The curved surface has a predetermined curvature at a position advancing a predetermined distance toward the bowl from a starting position of an exhaust-valve-side upper slanted surface of the protrusion portion.

It is preferable that an intake-valve-side ramp portion of the bowl is slanted outside and that a summit portion of the protrusion portion of the piston head is formed as a curved surface. Preferably, an intake valve pocket is formed on an intake-valve-side upper slanted surface of the protrusion portion of the cylinder. Further preferably, the intake valve pocket is formed as a single groove to receive all intake valves.

It is preferable that a split wall is disposed in the intake port such that the intake port is divided into an upper passageway and a lower passageway. The upper passageway acts as a tumble passage and a valve, disposed at an entrance of the lower passageway, selectively opens or closes the lower passageway.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF PREFERRED EMBODIMENTS

Figure 1:
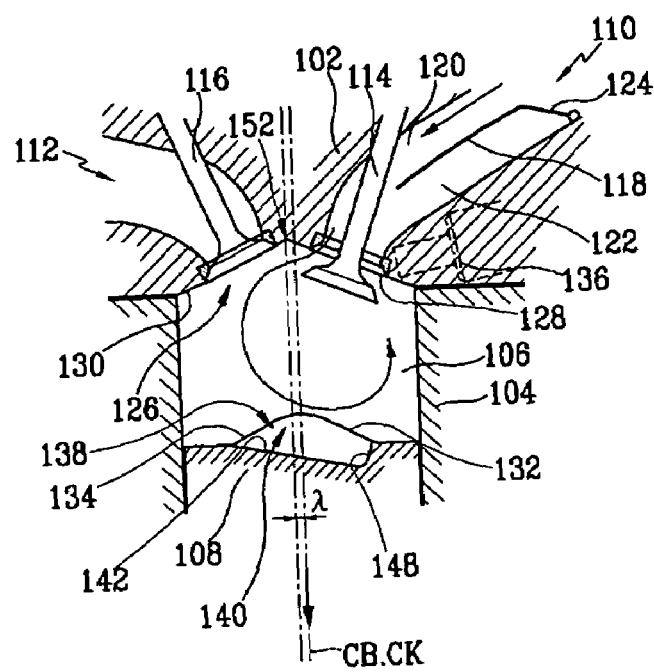
FIG. 1 is a sectional view of a direct injection engine according to an embodiment of the present invention.

According to FIG. 1, a main body of an engine is formed by a combination of a cylinder head 102 and a cylinder block 104. A piston 108 is vertically slidably disposed in a cylinder 106 that is defined within the cylinder block 104. An intake port 110 and an exhaust port 112 are formed in the cylinder head 102. The number of the intake port 110 and the exhaust port 112 depend on the number of intake and exhaust valves 114 and 116 employed in the engine.

A split wall 118 is disposed in a downstream direction of the intake port 110, which divides the intake port 110 into an upper passageway 120 and a lower passageway 122. A valve 124 is disposed in an inlet portion of the lower passageway 122 and selectively opens and closes the lower passageway 122. The valve 124 is operated by a drive motor that is controlled by an engine control unit. According to engine operating conditions, the valve 124 is controlled to be opened or closed by the engine control unit. When an air-fuel mixture is lean, the valve 124 is controlled to be closed such that air is taken into combustion chamber 126 in a tumbled state through the upper passageway 120.

The combustion chamber 126, as shown in FIG. 1, is formed between a lower surface of the cylinder head 102 and an upper surface of the piston 108. The lower surface of the cylinder head 102 includes an intake-valve-side slanted surface 128 and an exhaust-valve-side slanted surface 130 that are formed on both sides with respect to a position apart by a specific distance $\lambda$ toward the exhaust valve 116 (left direction in FIG. 1) from an imaginary surface CK including a center axis CB of the cylinder 106 and an axis of a crankshaft. Thereby, the lower surface of the cylinder head 102 has substantially a pent roof shape.

An upper surface of the piston 108 also has two slanted surfaces, i.e., an intake-valve-side upper slanted surface 132 and an exhaust-valve-side upper slanted surface 134 that, respectively, correspond to the intake-valve-side slanted surface 128 and the exhaust-valve-side slanted surface 130. That is, the upper surface of the piston 108 has substantially a pent roof shape. Therefore, the combustion chamber 126 is formed between the intake-valve-side upper slanted surface 132 and the exhaust-valve-side upper slanted surface 134 of the piston 108 and the intake-valve-side slanted surface 128 and the exhaust-valve-side slanted surface 130 of the cylinder head 102.

A fuel injector 136, for directly injecting fuel into the combustion chamber 126, is disposed in a portion of the cylinder head 102 where the intake port 110 is positioned. That is, the fuel injector 136 is disposed in the cylinder 102 proximate to the intake port 110. Injection timing and duration of injection from the fuel injector 136 are controlled by the engine control unit.

Figure 2:
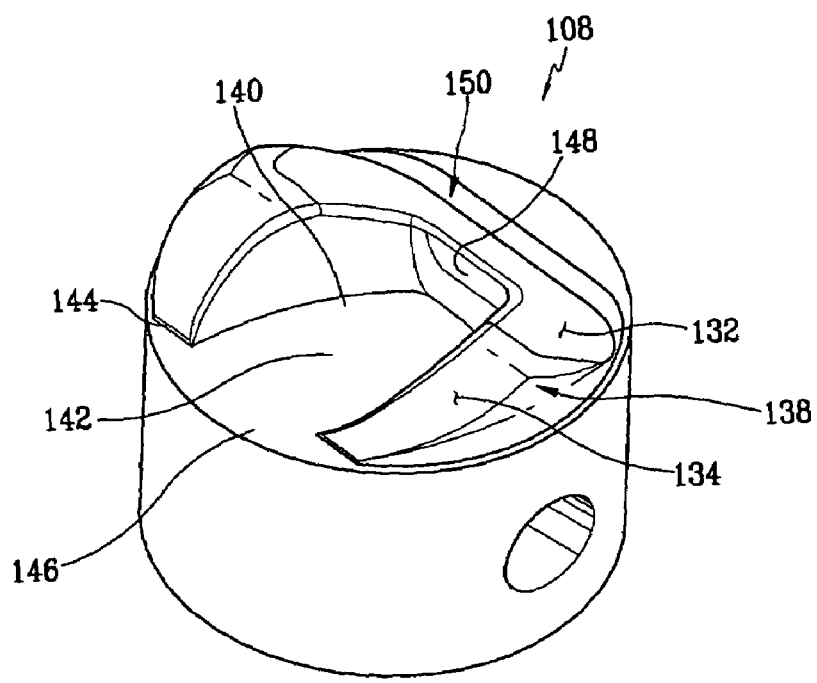
FIG. 2 is a perspective view of a piston of an engine according to an embodiment of the present invention.
Figure 3:
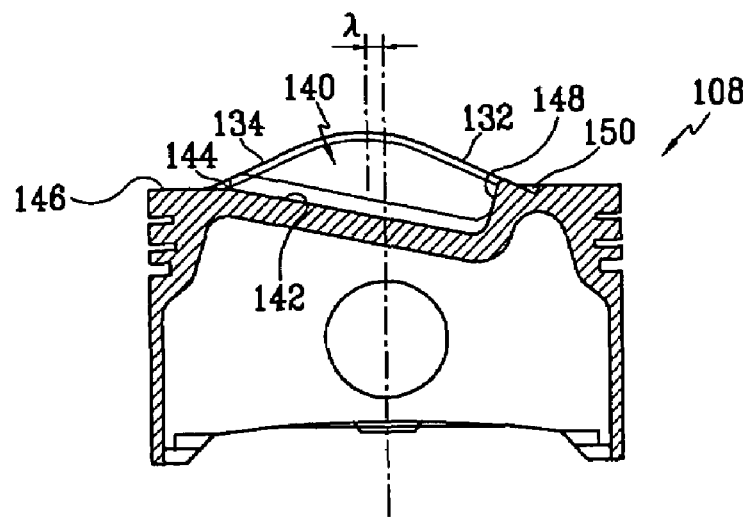
FIG. 3 is a sectional view of the piston of FIG. 2.
Figure 4:
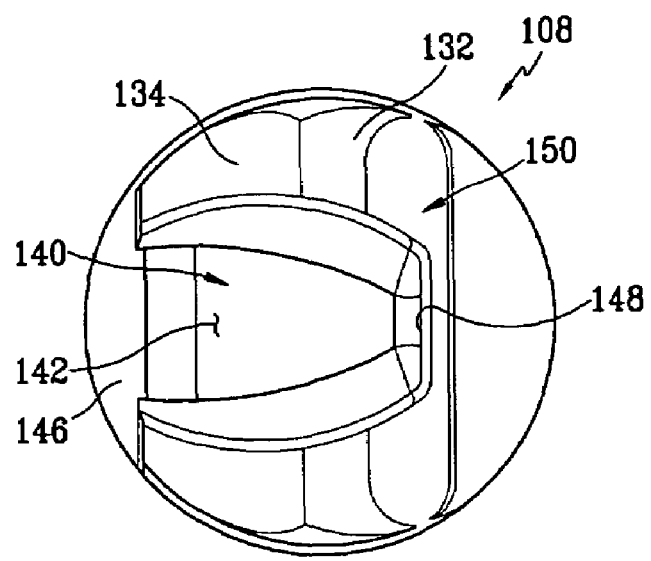
FIG. 4 is a top view of the piston of FIG. 2.

Referring to FIGS. 2–4, the shape of a head of the piston 108 acts as an important factor to determine the shape of the combustion chamber for complete combustion. The shape of the head of the piston 108 will be explained hereinbelow. A summit portion of a pent-roof-shaped protrusion portion 138, including the intake-valve-side upper slanted surface 132 and the exhaust-valve-side upper slanted surface 134, is formed as a curved surface having a specific curvature. A bowl 140 is formed at a center portion of the protrusion portion 138 along a direction perpendicular to the axis of the crankshaft. As shown in the FIGS., the bowl 140 has an approximately elliptical shape or a trapezoidal configuration the sides of which are curved lines instead of straight lines. The bowl 140 also has a longer axis that runs perpendicular to the axis of the crankshaft. In addition, in order for the intake air to smoothly enter the bowl 140, an exhaust-valve-side portion of the bowl 140 is opened and simultaneously a width of the exhaust-valve-side portion of the bowl 140 is wider than a width of an intake-valve-side portion of the bowl 140. Furthermore, as shown in FIG. 4, a width of the bowl 140 becomes wider with distance from an end of the exhaust-valve-side portion, then becomes narrower approaching an end of the intake-valve-side portion.

A bottom surface 142 of the bowl 140 is slanted by a predetermined angle, for example, approximately 12 degrees, to gradually lower approaching the intake-valve-side. The bottom surface 142 starts to be slanted at a position advancing a small amount toward the intake-valve-side portion from a starting position 144 of the exhaust-valve-side upper slanted surface 134. At this time, the bottom surface 142 is connected to a head surface 146 of the piston 108 by a smoothly-curved surface having a predetermined curvature (e.g., R45).

With this configuration of the bowl 140, the tumble flow can be smoothly introduced into the bowl 140 without a separation and can be prevented from flowing toward an exhaust-valve-side wall of the cylinder so that generation of a carbon layer, which can be generated by contact of fuel and oil with the wall, can be prevented.

Side walls of the bowl 140 are slanted such that a width of the bowl 140 becomes wider when approaching its top portion. The side walls are formed as curved surfaces that are indented toward the protrusion portion 138 so that the tumble flow flowing within the bowl 140 can be prevented from riding the side walls and then being separated from the bowl 140.

A ramp portion 148 forms an intake-valve-side end of the bowl 140. The ramp portion 148 is preferably formed to be approximately vertical. In an embodiment of the present invention, the ramp portion 148 is slightly slanted by a predetermined angle (e.g., 5 degrees), such that the bowl 140 is wider when it approaches a top portion thereof. The ramp portion 148 is formed at a position advancing toward the exhaust-valve-side portion from a starting position of the intake-valve-side upper slanted surface 132. An intake valve pocket 150 is formed throughout an end portion of the intake-valve-side upper slanted surface 132. The intake valve pocket 150 is formed to prevent an intake valve 114 from colliding with the upper surface of the piston 108 in an overlap range. In an embodiment of the present invention, the intake valve pocket 150 is formed as a single long groove that receives the intake valve so that carbon accumulation can be minimized.

Figure 5:
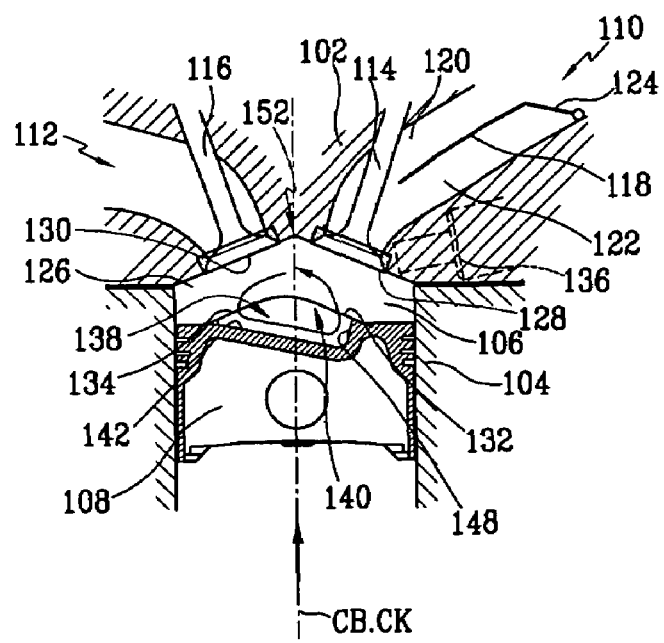
FIG. 5 shows a state of a compression stroke of an engine according to an embodiment of the present invention.

In the engine according to an embodiment of the present invention, when the piston 108 moves down for taking the air into the combustion chamber, the air that passes through the upper passageway 120 is agitated to form a tumble flow. When the piston 108 moves upward for compressing the air contained within the combustion chamber, the air flow passes through the bowl 140 and then further tumbled, as shown in FIG. 5. That is, while the air flow moves from the wide exhaust-valve-side portion of the bowl 140 to the narrow intake-valve-side portion of the bowl 140, the air flow is strongly concentrated. Then, after the air flow collides with the ramp portion 148, the air flow moves upwardly so that the air flow goes to the spark plug 152.

Figure 6:
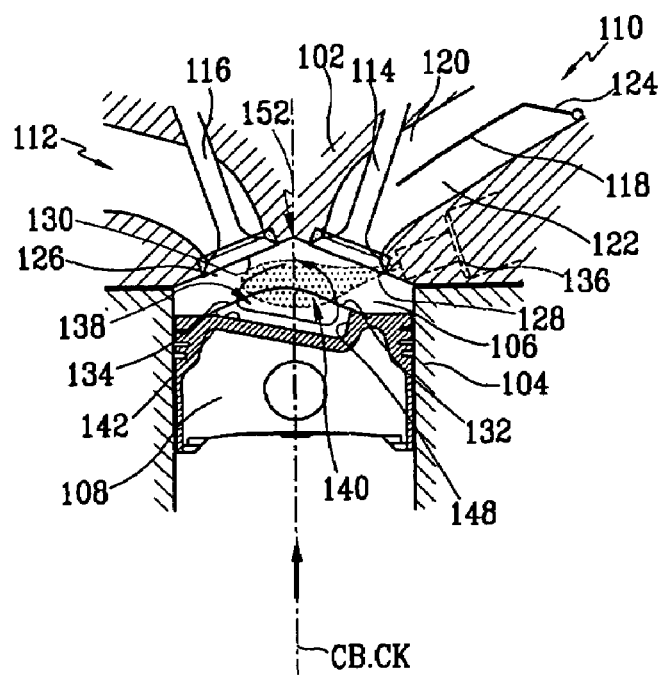
FIG. 6 shows a fuel injection process in an engine according to an embodiment of the present invention.
Figure 7:
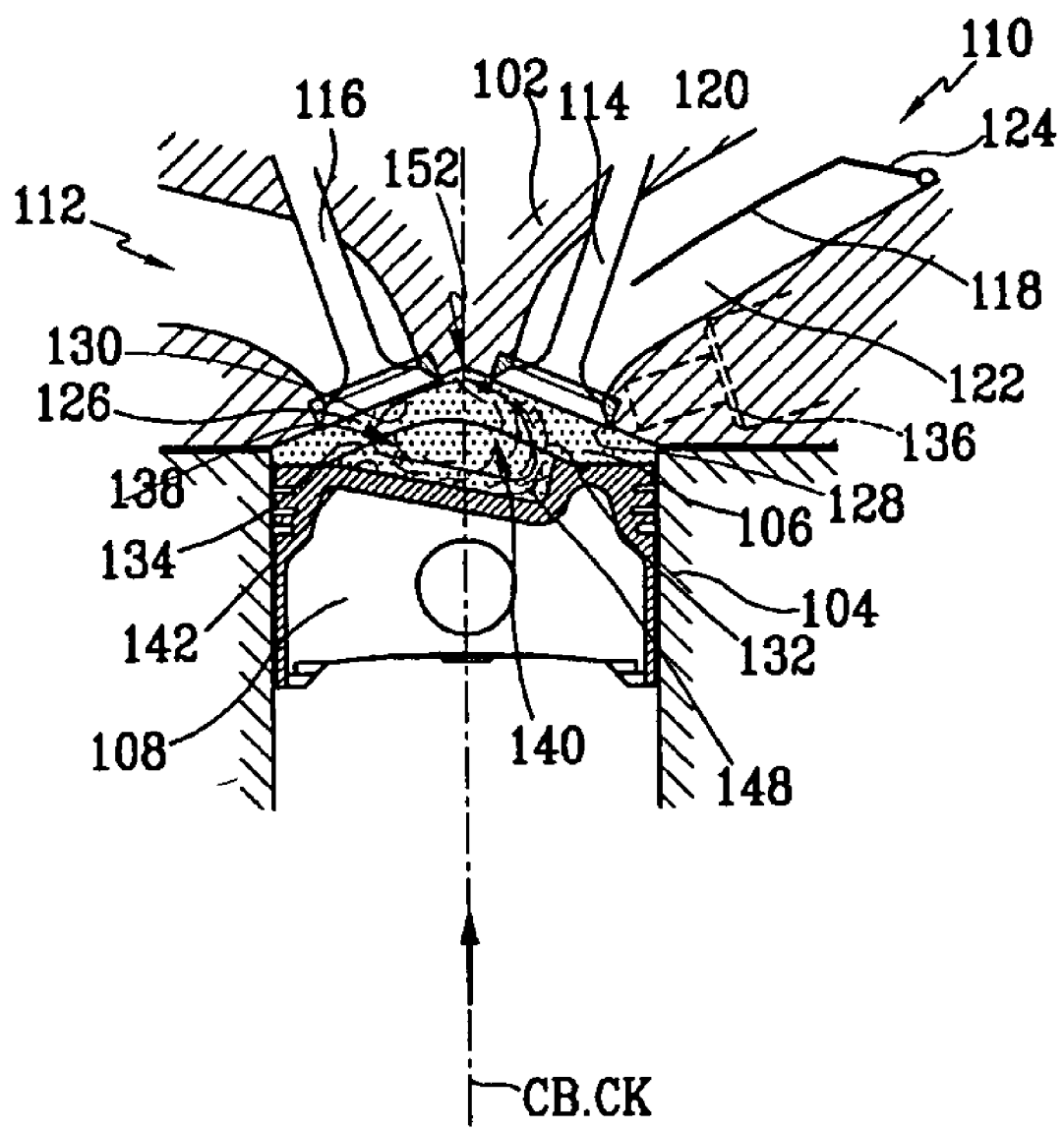
FIG. 7 shows flows of air-fuel mixture in a combustion chamber of an engine according to an embodiment of the present invention.

At this time, when fuel is injected into the combustion chamber, as shown in FIG. 6, the injected fuel is mixed with the tumbled air flow. The fuel is therefore vaporized in a relatively short time period, without contacting the bottom surface 142 of the bowl 140, so that an air-fuel mixture exists around the spark plug 152. The spark plug 152 then sparks the air-fuel mixture and the air-fuel mixture is burned.

In the present invention, because an exhaust-valve-side portion of the bottom surface of the bowl is connected to the upper surface of the piston by a smoothly curved surface, a separation of the tumble flow can be minimized so that the air flow is more strongly tumbled. In addition, fuel mixed with the air flow is also introduced into the bowl, so a generation of a carbon layer that is caused by a contact of fuel and oil can be prevented. Additionally, because a width of the exhaust-valve-side portion of the bowl is greater than a width of the intake-valve-side portion of the bowl and the side walls of the bowl are formed as curved surfaces, the air flow moves smoothly toward the intake-valve-side portion without being separated. The air flow then collides with the ramp portion. Consequently, highly tumbled air flow can be formed so that combustion characteristics are improved.

Furthermore, because the intake valve pocket is formed as a single groove, an accumulation of carbon can be minimized and a propagation of a flame during the combustion occurs easily. Therefore, combustion characteristics are further improved. Still furthermore, because fuel injected from the fuel injector is vaporized without colliding with the surface of the bowl, generations of a carbon layer and a wall wetting can be minimized so that the amount of hydrocarbon emissions is minimized.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A direct injection engine comprising:
    a combustion chamber formed between a lower surface of a cylinder head that is formed as a pent roof shape and an upper surface of a piston head with a pent-roof-shaped protrusion portion corresponding to a shape of the lower surface of the cylinder head;
    an intake valve and an exhaust valve that are respectively disposed in an intake port and an exhaust port that are formed in the cylinder head;
    a spark plug that is disposed in the cylinder head; and
    a fuel injector for directly injecting fuel into the combustion chamber,
        wherein the protrusion portion of the piston head is formed in a state of being biased toward an exhaust valve side from a cylinder center axis, a bowl is formed on the protrusion portion along a direction perpendicular to a direction of a crankshaft axis, an exhaust-valve-side portion of the bowl is opened, a width of the exhaust-valve-side portion of the bowl is wider than a width of an intake-valve-side portion thereof, side walls of the bowl are formed as curved surfaces that are indented toward the outside, a bottom surface of the bowl is slanted such that a depth of the bowl becomes deeper when approaching the intake-valve-side portion, and the intake port is formed such that intake air moves toward the exhaust-valve-side portion of the bowl.

2. The direct injection engine of claim 1, wherein the bowl is formed within the protrusion portion of the piston head.

3. The direct injection engine of claim 1, wherein side walls of the bowl are slanted toward the outside.

4. The direct injection engine of claim 1, wherein side walls of the bowl are formed as a whole as a curved line.

5. The direct injection engine of claim 1, wherein the exhaust-valve-side portion of the bowl is connected to a head surface of the piston through a curved surface having a predetermined curvature at a position advancing a predetermined distance toward the bowl from a starting position of an exhaust-valve-side upper slanted surface of the protrusion portion.

6. The direct injection engine of claim 1, wherein an intake-valve-side ramp portion of the bowl is slanted outside.

7. The direct injection engine of claim 1, wherein a summit portion of the protrusion portion of the piston head is formed as a curved surface.

8. The direct injection engine of claim 1, wherein an intake valve pocket is formed on an intake-valve-side upper slanted surface of the protrusion portion of the piston.

9. The direct injection engine of claim 8, wherein the intake valve pocket is formed as a single groove to receive all intake valves.

10. The direct injection engine of claim 1, wherein a split wall is disposed in the intake port such that the intake port is divided into an upper passageway and a lower passageway, the upper passageway acts as a tumble passage, and a valve is disposed at an entrance of the lower passageway to selectively open or close the lower passageway.

11. A direct injection engine, comprising:
a cylinder head defining;
an intake port and an exhaust port;
a lower surface of the cylinder head formed in a pent-roof shape, wherein the intake port penetrates a first side of the pent-roof shape lower surface and the exhaust port penetrates a second side of the pent-roof shape lower surface;
a cylinder block defining a cylinder, wherein the cylinder head couples with the cylinder block such that the pent-roof shape lower surface of the cylinder head is positioned with the cylinder; and
a piston configured to be slidable received within the cylinder, wherein the piston includes;
a head portion having a protrusion portion extending toward an exhaust valve side, wherein the protrusion portion defines a bowl formed along a direction perpendicular to a direction of a crankshaft axis, an exhaust-valve-side portion of the bowl is opened, a width of the exhaust-valve-side portion of the bowl is wider than a width of an intake-valve-side portion of the bowl, side walls of the bowl are formed as curved surfaces indented toward an outside circumference of the piston, a bottom surface of the bowl is slanted such that a depth of the bowl becomes deeper toward the intake-valve-side portion, and the intake port is formed such that intake air flows toward the exhaust-valve-side portion of the bowl.

12. The direct injection engine of claim 11, wherein side walls of the bowl are slanted toward the outside circumference of the piston.

13. The direct injection engine of claim 11, wherein the exhaust-valve-side portion of the bowl is connected to a head surface of the piston through a curved surface having a predetermined curvature at a position advancing a predetermined distance toward the bowl from a starting position of an exhaust-valve-side upper slanted surface of the protrusion portion.

14. The direct injection engine of claim 11, wherein an intake-valve-side ramp portion of the bowl is slanted outside.

15. The direct injection engine of claim 11, wherein a summit portion of the protrusion portion of the piston head is formed from a curved surface.

16. The direct injection engine of claim 11, wherein an intake valve pocket is formed on an intake-valve-side upper slanted surface of the protrusion portion of the piston.

17. The direct injection engine of claim 16, wherein the intake valve pocket is formed as a single groove to receive all intake valves.

18. The direct injection engine of claim 11, wherein a split wall is disposed in the intake port such that the intake port is divided into an upper passageway and a lower passageway.

* * * * *